United States Patent [19]

Horton

[11] Patent Number: 4,772,150

[45] Date of Patent: Sep. 20, 1988

[54] HINGE PIN ASSEMBLY

[75] Inventor: Lee A. Horton, Mundelein, Ill.

[73] Assignee: Dresser Industries, Inc., Dallas, Tex.

[21] Appl. No.: 47,745

[22] Filed: May 8, 1987

[51] Int. Cl.$^4$ .............................................. F16C 11/00
[52] U.S. Cl. ........................................ 403/39; 403/163;
403/288; 414/723; 37/118 A
[58] Field of Search ............... 403/161, 162, 163, 157,
403/158, 159, 39, 288; 414/723, 715; 37/118 A,
188 R, 103; 172/273

[56] References Cited

U.S. PATENT DOCUMENTS

| | | | |
|---|---|---|---|
| 4,096,957 | 6/1978 | Iverson et al. | 214/145 R |
| 4,150,856 | 4/1979 | Hakkenberg et al. | 305/11 |
| 4,243,341 | 1/1981 | Kabay et al. | 403/158 X |
| 4,251,182 | 2/1981 | Schroeder | 414/723 |
| 4,288,172 | 9/1981 | Livesay et al. | 403/317 |
| 4,331,339 | 5/1982 | Reinsma | 277/84 |
| 4,398,862 | 8/1983 | Schroeder | 414/723 |
| 4,457,521 | 7/1984 | Morley | 277/92 |
| 4,629,350 | 12/1986 | Siewert et al. | 403/161 X |

Primary Examiner—Andrew V. Kundrat
Attorney, Agent, or Firm—Roy L. Van Winkle

[57] ABSTRACT

This invention provides an improved hinge joint assembly for connecting linkage components on vehicles. The assembly includes a pin having a lubricant chamber therein with appropriate seals provided to prevent loss of lubricant and the entrance of deleterious materials into the pivotal parts of the joint. The pin is attached to one mounting bracket whereby when distortion between the mounting brackets occurs, all the axial loading is taken in the one bracket avoiding damage to the joint and maintaining the integrity of the seals.

13 Claims, 1 Drawing Sheet

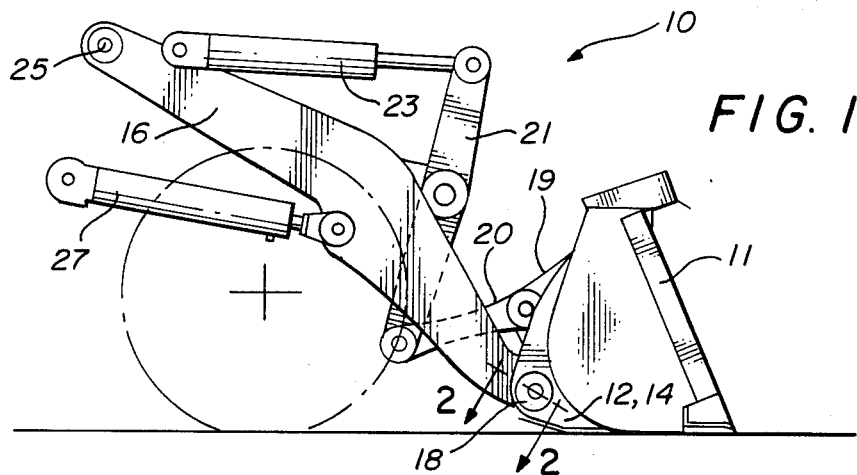
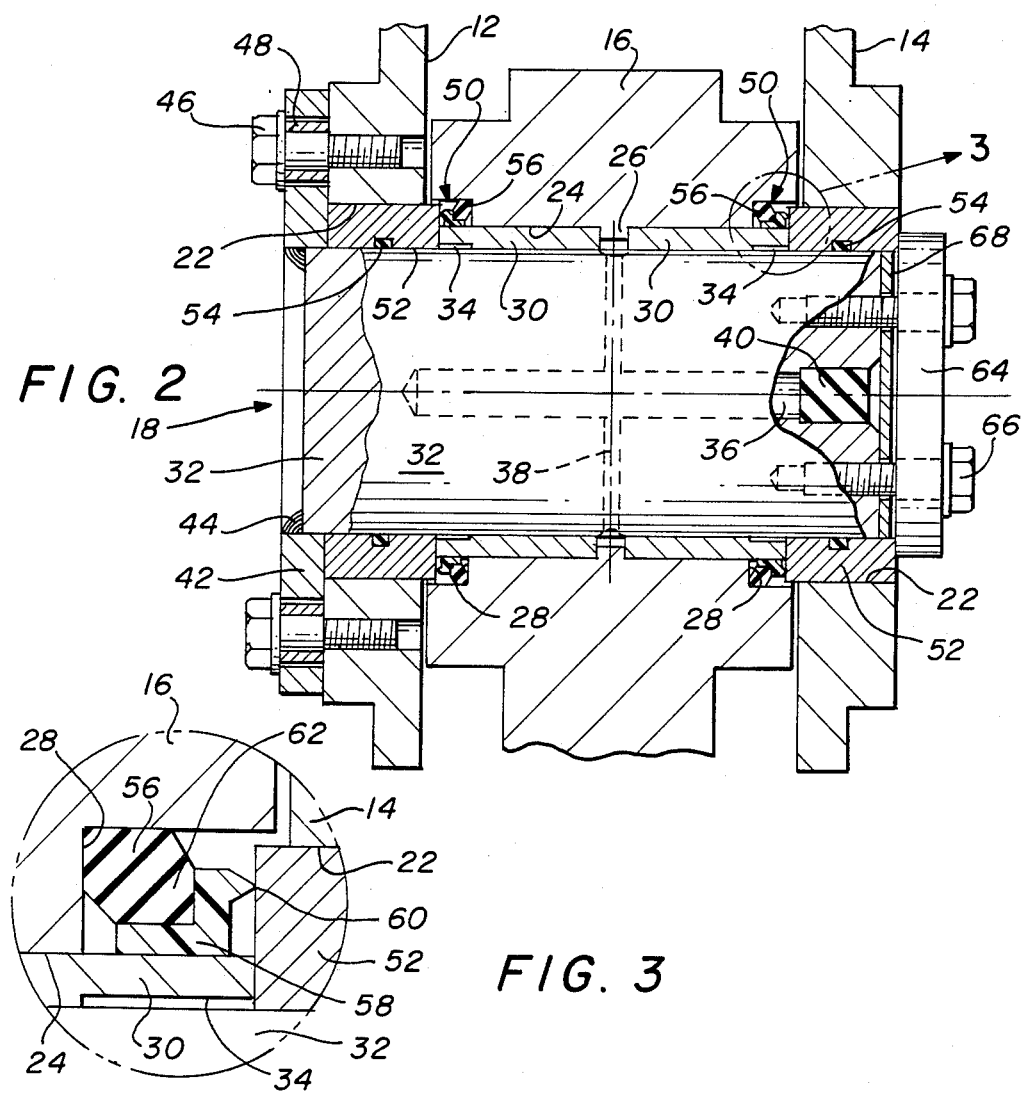

HINGE PIN ASSEMBLY

BACKGROUND OF THE INVENTION

This invention relates generally to an improved hinge pin assembly for use in connecting linkage components. More particularly, but not by way of limitation, this invention relates to an improved hinge pin assembly that is self lubricating, that is sealed, and that maintains the sealing relationship despite distortions occurring in the clevis brackets.

One type of pin that is commonly used in the industry for pivotally connecting linkage components in a front end loader is referred to as a cartridge pin. That is, the pin is composed of a relatively large number of elements which are preassembled and then placed into the aligned holes in the mounting brackets and the bore in the arm to pivotally connect such apparatus. An example of the cartridge type pin assembly is illustrated in U.S. Pat. No. 4,096,957 issued on June 27, 1978 to Lowell P. Iverson et al. Pins of that type have functioned generally satisfactorily, but they consist of a welded unit that includes the bearings or bushings, as well as the seals that isolate the lubricant between the bushing and the main body of the pin. Accordingly, when it is necessary to replace the pin cartridge, it is necessary to replace the entire unit. Further, some difficulty has been encountered due to the distortion that occurs when uneven loads are encountered by the bucket causing the clevis brackets to move slightly relative to each other, bringing the faces thereon into engagement with the sides of the loader arm. When this occurs, substantial wear occurs on the rubbing components.

Another patent illustrating a hinge pin assembly is U.S. Pat. No. 4,398,862 issued Aug. 16, 1983 to William L. Schroeder. That pin assembly includes an internally lubricated pin with a refillable lubricant chamber therein and appropriate seals for preventing the escape of lubricant from the assembly. However, because of the tapered surfaces and annular wedges involved, the pin of this patent is relatively expensive to manufacture, somewhat difficult to replace, and the seals therein are subject to a change in the axial dimension of the hinge joint which may cause either unusual seal wear or leakage when the joint is subject to extreme use.

An object of this invention is to provide an improved hinge pin assembly that is relatively inexpensive to manufacture, is constructed to maintain the seal integrity, self lubricating, and avoids wear between the loader linkage eye and the clevis brackets when uneven loads are encountered.

SUMMARY OF THE INVENTION

This invention provides an improved hinge pin assembly for pivotally connecting linkage clevis means to linkage eye means wherein the clevis means includes at least one set of spaced mounting brackets having aligned holes extending therethrough. The linkage eye is disposed between the brackets and has a bore therethrough aligned with the holes in the brackets and the linkage eye has a radially inwardly projecting flange in the bore. The improvement comprises a cylindrical bushing located in the bore on each side of the flange in the linkage eye and a cylindrical pin member having an enlarged head on one end that is sized to extend through the mounting brackets and linkage eye within the bushings. The pin has a lubricant reservoir therein and seal means are providing for forming a seal with the pin and for forming a seal between the bushing and the linkage eye preventing leakage of lubricant from the pin assembly. A cap member is provided that is releasably connected to the end of the pin remote from the head for retaining the pin member in assembled relationship to the seal means and bushing.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein:

FIG. 1 is a side elevation illustrating a portion of the linkages used on a front end loader connecting the loader bucket to the loader by improved hinge pin assemblies that are constructed in accordance with the invention.

FIG. 2 is an enlarged, transverse cross-sectional view of one of the hinge pin assemblies taken generally along the line 2—2 of FIG. 1.

FIG. 3 is an enlarged, fragmentary cross-sectional view taken generally along the line 3—3 of FIG. 2 illustrating one seal assembly in more detail.

DETAILED DESCRIPTION OF THE PREFERRED EMBODIMENT

Referring to the drawing and to FIG. 1 in particular, shown therein and generally designated by the reference character 10 is a loader that includes a bucket 11 having spaced clevis or mounting brackets 12 and 14 (see FIG. 2). The bucket 11 has two sets of brackets, but only one is shown. An eye of each loader arm 16 (only one arm 16 is illustrated) is pivotally connected to the brackets 12 and 14 by a hinge pin assembly 18 that is constructed in accordance with the invention. To control the pivoting of the loader bucket 11 with respect to the loader arm 16, mounting brackets 19 are connected to a link 20 extending from a bellcrank that is connected to a bucket cylinder 23 that is mounted on the vehicle (not shown). Also, the opposite end 25 of the loader arm 16 will be connected with the loader 10. Lift cylinder 27 is provided to control the raising and lowering of the bucket 11.

Each of the mounting brackets 12 and 14 is provided with a hole 22 that extends therethrough. It will be understood that the holes 22, including the holes in the mounting brackets that are not shown, are in axial alignment.

In axial alignment with the holes 22 is a bore 24 that is formed in the eye of the loader arm 16. It will be noted that the bore 24 extends inwardly from each side of the loader arm 16 thereby providing a centrally located, radially and inwardly projecting annular flange 26 for purposes that will be explained more fully hereinafter. Each end of the bore 24 is provided with a counterbore 28.

Located in the bore 24 on each side of the flange 26 is a bushing 30 that is sized to closely receive a hinge pin 32. The bushings 30 are preferably pressed into the bore 24 so that the bushings 30 do not rotate relative to the arm 16.

As may be seen more clearly in FIG. 3, one end, that is the outboard end of each of the bushings 30, is provided with a counterbore 34 so that the interior of the bushing 30 stands off the outside of the pin 32 by small distance. The counterbore prevents the end of the bushings 30 from engaging the pin 32 should deformation of the brackets occur during the operation of the bucket 11.

The pin 32 has a lubricant reservoir 36 formed therein that is connected to the outside surface of the pin by radially extending passageways 38. Thus, lubricant in the chamber 36 can reach the surface of the pin 32 on the interior of the bushings 30 reducing the friction therebetween upon pivoting movement of the arm 16 relative to the bucket 11. It will also be noted that the reservoir 36 is closed and sealed by a plug 40 that is preferably constructed from a resilient plastic so that a needle may be used to penetrate the plug 40 to add lubricant to the chamber 36.

The left end of the pin 32 as seen in FIG. 2 is provided with an enlarged flange 42 which is welded thereto at 44. As illustrated, the pin 32 is retained assembled with the bracket 12 and extending through loader arm 16 and bracket 14 by a plurality of threaded fasteners 46 that extend through the flange 42 and are attached to the mounting bracket 12. To prevent distortion of the flange 42, bushings 48 are located between the threaded fasteners 46 and the flange 42. The bushings 48 are slightly longer than the thickness of the flange 42 to avoid the imposition of a load from the threaded fasteners 46 on the flange 42, causing distortion which might cause the pin 32 to bind.

Seal means generally designated by the reference character 50 is located in the hinge assembly to prevent the entrance of deleterious materials into the bushing area and to prevent the escape of lubricant therefrom. The seal means 50 includes a pair of seal members 52 having annular seals 54 located on the interior thereof in sealing engagement with the exterior of the pin 32. The seal members 52 are located in the holes 22 in the brackets 12 and 14 as illustrated.

Seal means 50 also includes seals 56 that are shown in more detail in FIG. 3. The seals 56 include a relatively rigid, annular seal member 58 that is preferably constructed from a material such as a high density plastic, for example, nylon, Teflon or delrin. The seal member 58 is in sliding and sealing engagement with the seal member 52 along an annular line formed by the projection 60 thereon. The seal 56 also includes a relatively resilient member 62 that operates not only as a seal but as a spring to continually bias the seal member 58 into sealing engagement with the seal member 52.

To retain the pin 32, bushings 30 and seal means 50 in axial assembled relationship, there is provided a cap member 64 that is releasably attached to the end of the pin 32 opposite to the flange 42 by a plurality of threaded fasteners 66. The outer diameter of the cap 64 is not greater than the outer diameter of the seal member 52 so that the bracket 14, if distortion occurs, can move outwardly relative to the pin 32.

A shim 68 is located adjacent to the end of the pin 32 and between the pin 32 and the cap 64. The shim 68 is provided so that the axial length of the assembly is maintained and the integrity of the seals 56 will be maintained even though distortion may occur because the spaces that they occupy is of fixed dimension.

The maintenance of the size of the seal spaces is possible due to the solid length of the pin 32 between the flange 42 on one end, the seal members 52, the bushings 30 and the radially inwardly extending flange 26 on the arm 16 and the shim 68 and cap member 64 on the other end. Thus, the relative distances between the various components cannot change. In the event that serious distortion occurs in the bucket 11 when engaging an uneven load, causing distortion of the mounting brackets 12 and 14, it may be possible that the bracket 14 could engage the arm 16, but this will be only intermittent engagement and not sufficient to cause serious damage.

After initial assembly, lubricant is added to the chamber 36 by unscrewing the threaded fastener 66, removing the cap 64 and inserting a lubricating device, which will include a needle to penetrate the plug 40, through the plug 40. Lubricant is then injected under pressure into the chamber 36. The cap 64 is replaced by replacing the fasteners 66.

Should it be necessary to replace or repair the entire assembly, the threaded fasteners 66 are removed, taking the cap 64 off the end of the pin 32 and the threaded fasteners 46 retaining the pin in the assembly are removed. Upon removal of the pin 32, the seal members 52, seals 56 and bushings 30 can be easily removed from the holes 22 in the brackets 12 and 14 and from the bore 24 in the loader arm 16.

The necessary parts of the assembly are then replaced with the pin 32 being reinserted and assembled within the brackets 12 and 14 and the arm 16 in the reverse order.

It should also be pointed out that both of the bushings 30, both seals 56, and both seal members 52 are identically constructed and are completely interchangeable, thereby reducing the manufacturing cost and the inventory of parts necessary to maintain the joints operational.

While the detailed description refers particularly to the hinge pin assembly 18 between the bucket 11 and loader arms 16, it will be understood that the hinge pin assembly 18 may be advantageously used in any pivotal connection involving an eye connected to a clevis. For example, in the loader 10, the hinge pin assembly 18 can be used in connecting the following:
1. Boom arm 16 to the bucket 11
2. Boom arm 16 to the loader frame
3. Lift cylinder 27 to the frame
4. Lift cylinder 27 to the boom arm 16
5. Boom arm 16 to the bell crank 21
6. Bell crank 21 to the bucket cylinder 23
7. Bell crank 21 to the link 20
8. Link 20 to the bucket 11
9. Bucket cylinder 23 to the loader frame Having described but one embodiment of the invention, it will be understood that many changes and modifications can be made thereto without departing from the spirit or scope of the invention.

What is claimed is:

1. An improved hinge pin assembly for pivotally connecting a linkage clevis to a loader linkage eye wherein said clevis includes two sets of spaced first and second mounting brackets having aligned holes extending therethrough and said eye is arranged to be located between said brackets, the improvement comprising:
   a bore in each said linkage eye aligned with the holes in said brackets;
   a radially and inwardly projecting flange in a bore in each said linkage eye;
   a cylindrical bushing located in said bore on each side of each of said flanges;
   a counterbore in said linkage eye in each end of said bores;

a cylindrical pin member having an enlarged head on one end and extending through each set of mounting brackets within said bushings;

seal means for forming a seal with said pin member and for forming a seal between said bushings and said linkage eye preventing leakage from said pin assembly; and, a cap member releasably connected to the end of said pin remote from said head for retaining said pin member in axial assembled relationship to said seal members and bushings.

2. The assembly of claim 1 wherein said seal means includes:

a first annular seal member located within each said hole in engagement with said bushings, each seal member forming a seal with said pin member; and, a second annular seal member encircling each said bushing in sliding and sealing engaging each said first seal member.

3. The assembly of claim 1 and also including a lubricant reservoir in said pin member.

4. The assembly of claim 3 and also including a self-sealing plug whereby lubricant can be injected into said reservoir.

5. The assembly of claim 4 wherein said plug is constructed from a resilient plastic.

6. The assembly of claim 1 and also including fastener means for attaching said head to one of said brackets.

7. The assembly of claim 6 wherein said cap member has a diameter not greater than the diameter of said holes, said first seal members, linkage eye and mounting bracket to which said head is attached being retained in fixed axial relationship thereby maintaining the integrity of said seal means and preventing engagement between said mounting brackets and linkage eye.

8. The assembly of claim 1 wherein each said bushing includes a counterbore in each end for preventing engagement between one end of each bushing and said pin member upon distortion of said mounting brackets thereby preventing damage to said bushings by said pin member.

9. An improved hinge pin assembly for pivotally connecting a linkage clevis to a linkage eye wherein said clevis includes at least one set of spaced mounting brackets having aligned holes extending therethrough and said linkage eye is disposed between said brackets, has a bore therethrough aligned with the holes in said brackets, and said linkage eye has a radially, inwardly projecting flange therein, the improvement comprising:

a cylindrical bushing located in said bore on each side of the flange in said linkage eye;

a cylindrical pin member having an enlarged head on one end and sized to extend through said mounting brackets and linkage eye within said bushings;

seal means forming a seal with said pin member and for forming a seal between said bushings and said linkage eye preventing leakage of lubricant from said pin assembly; and, a cap member releasably connected to the end of said pin member remote from said head for retaining said pin member in axial assembled relationship to said seal means and bushings.

10. The assembly of claim 9 wherein said seal means comprises:

a first annular seal member located within each said hole in engagement with said bushings, each seal member forming a seal with said pin member;

a second annular seal member encircling each said bushing in sliding and sealing engaging each said seal member; and, a cap member releasably connected to the end of said pin member remote from said head for retaining said pin member in assembled relationship to said seal members and bushings.

11. The assembly of claim 9 and also including fastener means for attaching said head to one of said brackets.

12. The assembly of claim 11 wherein said cap member has a diameter not greater than the diameter of said holes, said first seal members, linkage eye, and mounting bracket to which said head is attached being retained in fixed axial relationship thereby maintaining the integrity of said seal means and preventing engagement between said mounting brackets and linkage eye.

13. The assembly of claim 9 wherein each said bushing includes a counterbore in each end for preventing engagement between one end of each bushing and said pin member upon distortion of said mounting brackets thereby preventing damage to said bushings by said pin member.

* * * * *